April 15, 1958  H. R. A. HANSEN ET AL  2,831,133
HIGH FREQUENCY ALTERNATOR FIELD WINDING
Filed Sept. 22, 1954  3 Sheets-Sheet 2

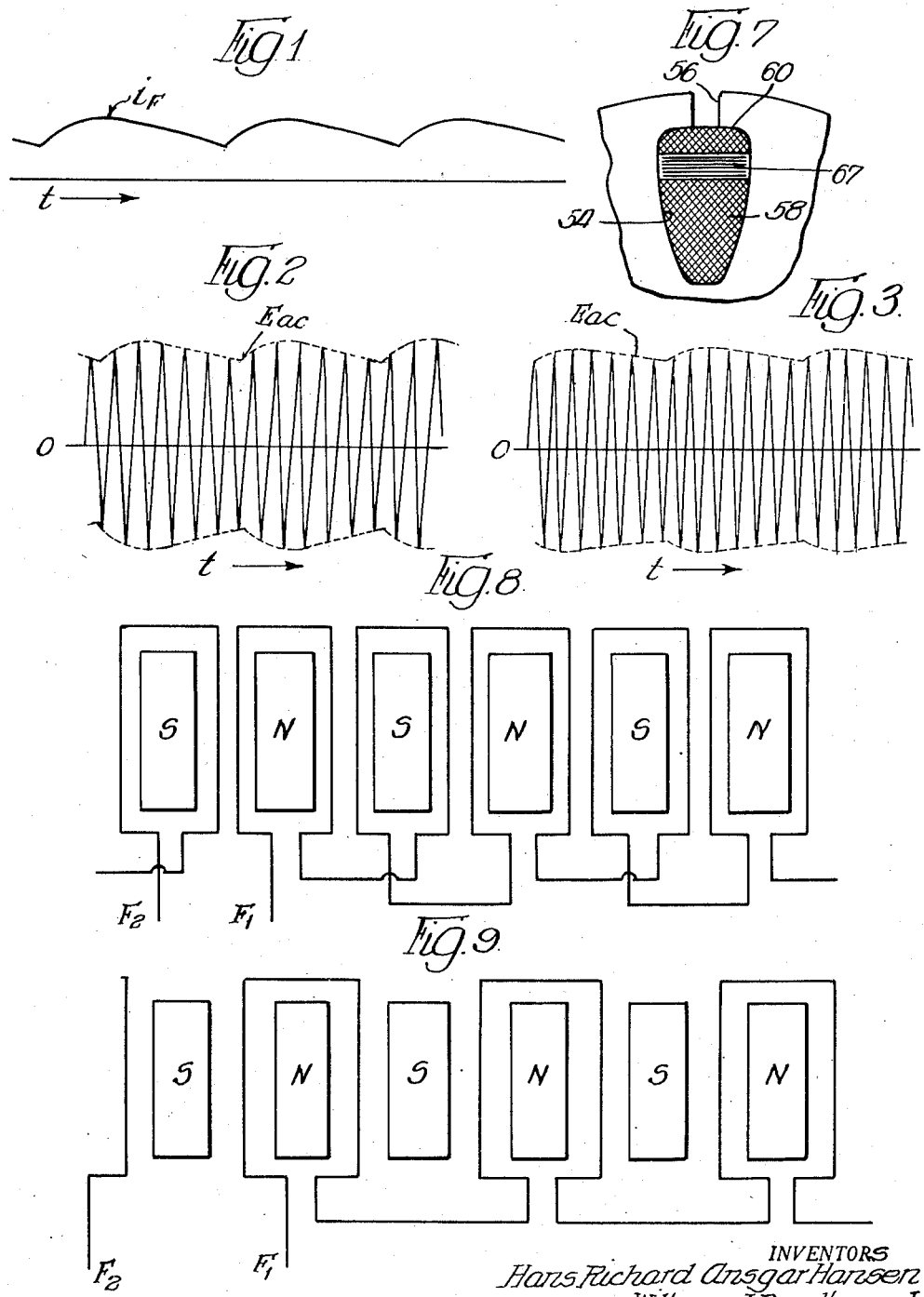

INVENTORS.
Hans Richard Ansgar Hansen,
By William J. Bradburn, Jr.
Wilkinson, Huxley,
Byron & Hume Attys April 15, 1958   H. R. A. HANSEN ET AL   2,831,133
HIGH FREQUENCY ALTERNATOR FIELD WINDING
Filed Sept. 22, 1954   3 Sheets-Sheet 3
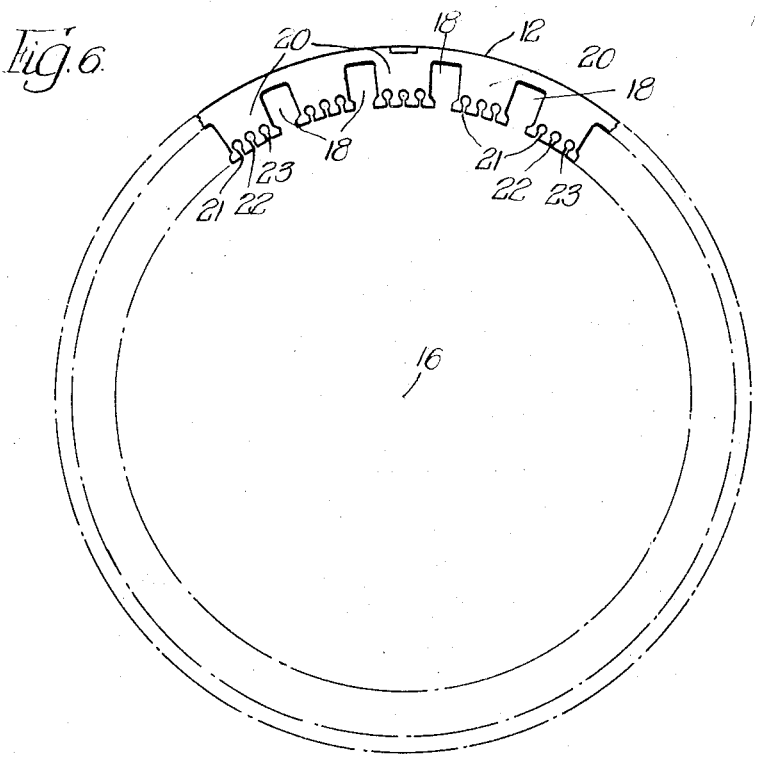
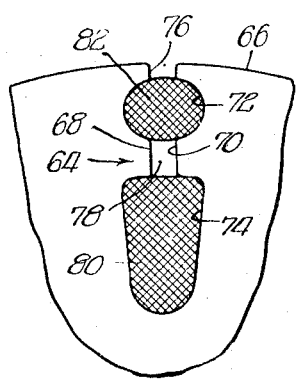
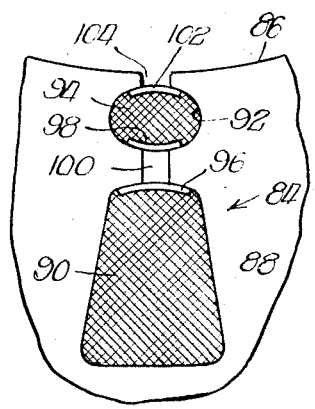
INVENTORS
Hans Richard Ansgar Hansen,
BY William J. Bradburn, Jr.

United States Patent Office 2,831,133
Patented Apr. 15, 1958

2,831,133

HIGH FREQUENCY ALTERNATOR FIELD WINDING

Hans Richard Ansgar Hansen, Cudahy, and William J. Bradburn, Jr., Milwaukee, Wis., assignors to The Louis Allis Co., Milwaukee, Wis., a corporation of Wisconsin Application September 22, 1954, Serial No. 457,656

7 Claims. (Cl. 310—183)

This invention relates to a high frequency alternator field winding, and more particularly to a field winding for such an alternator which is adapted to be excited by a unidirectional current.

The use of magnetic amplifier voltage regulators for the regulation of high frequency alternators is becoming quite common and a circuit of this type is disclosed in applicants' copending application, Serial Number 461,556, filed October 11, 1954, entitled Voltage Regulator for Alternator. When a single phase magnetic amplifier is used in such a circuit, the unidirectional current output of the magnetic amplifier as a source of field supply for the alternator causes considerable amplitude modulation to appear in the output voltage of the alternator. Such an alternator is normally operated with a very low degree of saturation, so that small variations in field current affect the magnitude of the output voltage.

It is therefore an object of this invention to provide a field winding for a high frequency alternator which will overcome the modulation caused by a single phase, unidirectional, field current supply.

Another object is to provide a device of this character, which is simple in construction and operation and which can be readily incorporated in a conventional alternator with only a minimum amount of changes being necessary in the physical construction of the alternator.

Further objects and advantages of this invention will become evident as the description proceeds and from an examination of the accompanying drawings, which illustrate several embodiments of the invention and in which similar numerals refer to similar parts throughout the several views.

In the drawings:

Figure 1 is a diagrammatic drawing of the wave shape of the full wave rectified field current such as is obtained from a single phase magnetic amplifier voltage regulator.

Figure 2 is a diagrammatic showing of the wave shape of the output voltage of a high frequency alternator having an exciter current such as is illustrated in Figure 1.

Figure 3 is a diagrammatic showing of the wave shape of the output voltage of an alternator which has been provided with a field winding incorporating this invention.

Figure 6 is a plan view of one of the laminations used to make up the stator core shown in Figures 4 and 5.

Figure 7 is a view in vertical section of a fragmentary portion of a rotor having a field winding thereon, incorporating an embodiment of the invention.

Figure 8 is a diagrammatic representation of the manner in which the field coil may be wound.

Figure 9 is a diagrammatic representation of another way in which the field coil may be wound.

Figure 10 is a view in vertical section of a fragmentary portion of an alternative form of rotor having a field winding thereon incorporating this invention.

Figure 11 is a view in vertical section of a fragmentary portion of a stator having a field winding thereon, incorporating the invention.

As previously stated, the use of a unidirectional current derived from a standard commercial power frequency source and used as a field supply for high frequency alternators, such as the current shown in Figure 1, causes considerable amplitude modulation to appear in the output voltage, as shown in Figure 2. In such a case, there is insufficient inductance in the field winding and a ripple frequency of twice the frequency of the power supply to the rectified source appears in the field current (as shown in Figure 1). Since the alternator works at a very low degree of saturation, this causes a similar ripple to appear in the alternator field flux. As a result, an amplitude modulation appears in the alternator output voltage as shown in Figure 2. Thus, the alternator output acts as a carrier which is modulated in amplitude by the ripple frequency of the field current. The resulting periodic variation in amplitude of the output voltage can be as high as twenty percent of the nominal output voltage depending on the constants of the equipment. Since this condition is very undesirable, this invention relates to a simple means by which the output voltage can be made substantially free of these periodic variations in output magnitude.

It has been discovered that the output voltage of such an alternator can be smoothed so that it is substantially free of this modulation, by providing the alternator with two field windings, one of which is shorted. The shorted field should be in the top of the slots (nearest the armature) and should have as low a resistance as possible. Such an arrangement will give an output voltage having a wave shape similar to that shown in Figure 3.

Figure 4:
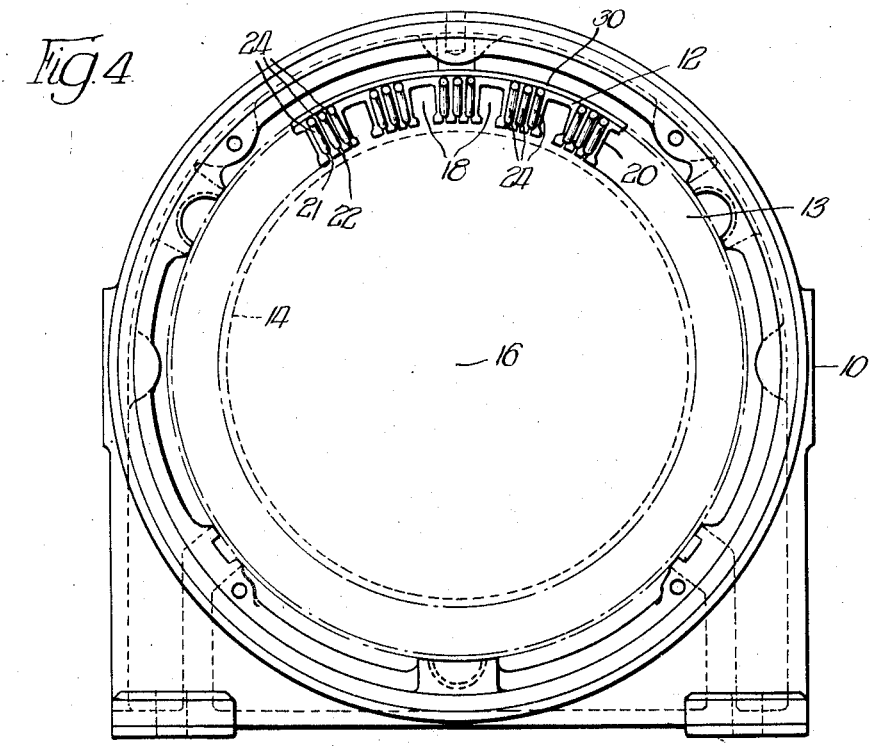
Figure 4 is a view in elevation of one form of alternator frame and stator core incorporating this invention.
Figure 5:
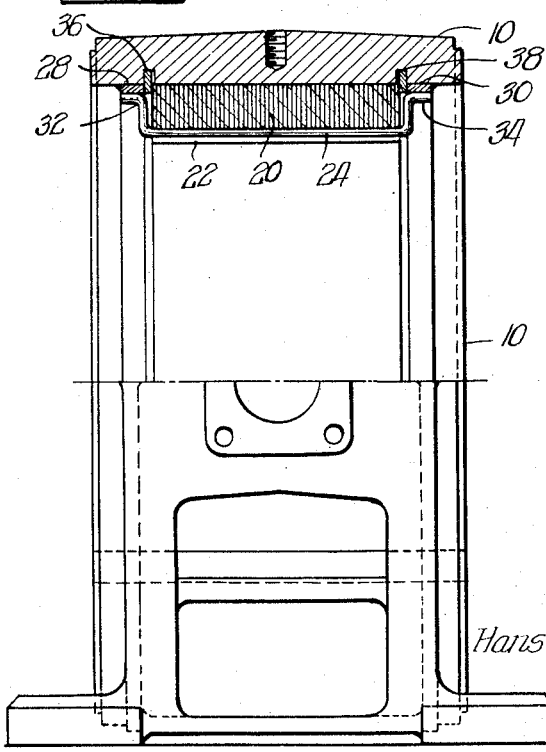
Figure 5 is a side view in elevation and partly in vertical section, of the frame and stator core shown in Figure 4.

It has been found that the field winding may be so modified in two ways. A multi-turn damper winding can be incorporated, or a squirrel cage damper winding may be utilized. One form of arrangement is shown in Figures 4 and 5. A supporting frame 10 is provided which has secured internally thereto a plurality of laminations 12 which form a stationary field core 13. A rotor 14 is shown diagrammatically, mounted within the field core and adapted to rotate about the axis 16 the conventional armature windings on the rotor being omitted for the sake of simplicity. As best shown in Figure 4, the field core 13 is provided with a plurality of transverse, radial slots 18 disposed in spaced relation around the core and adapted to receive the coils of the field winding. Such a winding may take the forms shown in Figures 8 and 9, for example.

Each of the pole pieces 20 formed by the slots 18 may be provided with a plurality of secondary slots 21, 22 and 23, as best shown in Figure 6, in the extremity thereof adjacent to the rotor. These slots are quite shallow with respect to slots 18 and are adapted to receive the transverse bars 24 of the squirrel cage winding. The two end rings 28 and 30, best shown in Figure 5, may be provided, these rings being adapted to have the ends 32 and 34 of each transverse bar 24 secured thereto, as by brazing, after the ends have been bent downwardly and outwardly so as to be brought into close association therewith. Two retainer rings 36 and 38 may be provided adjacent the end rings 28 and 30, the retainer rings being seated in appropriate slots 40 and 42 formed in the frame member 10. The outermost laminations of the field core 13 are abutted at their bases by these two retainer rings 36 and 38.

These transverse bars 24 are preferably installed prior to the installation of the field winding. This type of installation of the bars 24 is therefore extremely convenient and desirable, since it places the transverse bars and end rings so that they are entirely out of the way when the field winding is being put into place.

As previously stated, the invention can also be incorporated in a multi-turn damper winding. Figure 7 shows such a winding in a form of alternator having a rotating field winding disposed on a rotor. As shown in that figure, a slot 54 may be provided in the rotor having a restricted neck 56 at the top thereof. A field winding 58 may be disposed in the bottom of the slot 54 and a multi-turn damper winding 60 is disposed above the winding 58 in the portion of the slot 54 immediately below the restricted neck 55. Satisfactory results have been obtained by merely disposing the shorted field winding either in the form of a squirrel cage winding or a multi-turn winding on top of the field winding, but it has also been found that the results can be improved by placing iron lamination strips 67 between the two windings. The flux produced by the alternating component of the current is then shunted to the iron laminations through the action of the winding in the top slot. The direct current flux, however, is unaffected by the damper winding and traverses the air gap between the rotor and stator so that the direct current flux alone links the stator conductors of the alternator. This is apparently also substantially what happens when the type of construction previously discussed and shown in Figures 4, 5 and 6 is utilized.

Both the primary field winding and the damper field winding can have a configuration and arrangement such as is shown in Figures 8 and 9, for example. The form of the field core can be substantially the same as that shown in Figures 4 and 5, except, of course, that the slots 21, 22 and 23 can be omitted. The main field winding is then placed in the bottom of the slot 18 and the damper winding is placed on top thereof so that it is disposed between the main field winding and the armature 14.

An alternative form of slot 64 is shown in Figure 10 in the rotor 66. In this form of slot, the iron lamination strips 62 shown in Figure 7 have been in effect replaced by the shoulders 68 and 70, disposed between the upper and lower recesses 72 and 74 of the slot 64. The recess 72 is provided with a restricted neck 76 and a similar restricted opening 78 is provided between the recesses 72 and 74 to enable the insertion of the field winding 80 in the recess 74. The damper winding 82 may be placed in the recess 72 as shown.

Still another form of slot 84 is shown in Figure 11, disposed in the stator 86. This slot is generally similar to the slot 64 previously described and shown in Figure 10, but is of slightly different configuration because of the fact that it is provided in a stator rather than a rotor. The recess 88 is adapted to receive the field winding 90 and the recess 92 is likewise adapted to receive the damper winding 94. In addition, the retaining members 96 and 98 may be provided above and below the slot 100, disposed between the recesses 88 and 92. These retaining members 96 and 98 may be made of any suitable non-magnetic material and serve to maintain the windings 90 and 94 in place within the recesses 88 and 92. A similar retaining member 102 may be provided at the base of the opening 104 at the top of the recess 92.

Experiments carried out with such a multi-turn damper winding utilizing slip rings so that either or none of the windings could be shorted, produced results comparable to those shown in Figures 2 and 3. Without any shorted winding, the output voltage appeared as shown in Figure 2 and the percent ripple was calculated to be 8.25 percent. When the top field winding was shorted with the bottom winding used as the field supply, the output voltage appeared as in Figure 3, and the percent ripple was calculated to be 2.42 percent.

When a multi-turn damper winding is utilized it need not, of course, have as great a cross-sectional area as the main field winding. Successful applications have been made wherein the damper winding was approximately one-fifth as large in cross-sectional area as the main field winding. As the cross-sectional size of the damper winding increases, the damping is improved, but at the same time, the field winding tends to run hotter, so that a suitable compromise must be achieved.

In the drawing and specification, there has been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

We claim:

1. In a high frequency alternator adapted to be excited by a unidirectional, pulsating current and having an armature winding, the combination of a winding support member, coil receiving slots in said member, a main field winding, the coils of which are disposed in said slots at the bottom thereof, and a shorted damper winding disposed in said slots near the open end thereof spaced apart from said main field winding.

2. In a high frequency alternator adapted to be excited by a unidirectional pulsating current and having an armature winding, the combination of a stator core adapted to have a rotor rotatably mounted therein, a plurality of spaced coil receiving slots formed on the interior surface of said core adjacent to said rotor, a restricted neck within each slot, a field winding, the coils of which are disposed in said slots below the restricted neck thereof, and a damper winding, the turns of which are disposed in said slots above the restricted neck thereof.

3. In a high frequency alternator adapted to be excited by a unidirectional pulsating current, a supporting frame, a stator core supported by said frame, a rotor mounted for rotation within said stator core, a plurality of spaced, transverse, radial slots formed in said rotor, a restricted neck within each slot, a field winding, the coils of which are disposed in said slots below the restricted neck thereof, and a damper winding, the turns of which are disposed in said slots above the restricted neck thereof.

4. In a high frequency alternator adapted to be excited by a unidirectional pulsating current and having an armature winding, the combination of a field winding support member, an armature winding support member, said members being mounted for relative rotation, one within the other, a plurality of transverse radial slots in said field coil support member adjacent to said armature winding support member, a restricted neck intermediate the top and bottom of each of said slots, a field winding, the coils of which are disposed in the interior of said slots between said restricted neck and the inner extremity of said slots, a second restricted neck at the outer extremity of each said slot and a damper winding the turns of which are disposed in said slots between said first named and said second restricted neck.

5. In a high frequency alternator adapted to be excited by a unidirectional, pulsating current and having an armature winding, the combination of a winding support member, coil receiving slots in said member, a main field winding, the coils of which are disposed in said slots at the bottom thereof, and a shorted damper winding disposed in said slots near the open end thereof and spaced apart from said main field winding by magnetic material.

6. In a high frequency alternator adapted to be excited by a unidirectional, pulsating current and having an armature winding, the combination set forth in claim 5 wherein said magnetic material is integral to said winding support member and defines in each of said slots a restriction between that portion at the bottom thereof and that portion near the open end thereof.

7. In a high frequency alternator adapted to be excited by unidirectional, pulsating current and having an armature winding, the combination set forth in claim 5 wherein said magnetic material comprises a stack of iron lamination strips.

References Cited in the file of this patent

UNITED STATES PATENTS

| | | |
|---|---|---|
| 890,776 | Leblanc | June 16, 1908 |
| 902,065 | Field | Oct. 27, 1908 |
| 1,590,508 | Hellmund | June 29, 1926 |

FOREIGN PATENTS

| | | |
|---|---|---|
| 170,851 | Great Britain | Feb. 26, 1923 |
| 778,336 | France | Dec. 22, 1934 |
| 449,893 | Germany | Nov. 3, 1927 |
| 134,473 | Switzerland | Nov. 16, 1929 |